Patented May 9, 1950

2,506,997

UNITED STATES PATENT OFFICE 2,506,997

MANUFACTURE OF OIL RESISTING RUBBERS

John Ivan Cunneen, Welwyn Garden City, England, assignor to The British Rubber Producers Research Association, London, England No Drawing. Application July 3, 1946, Serial No. 681,413. In Great Britain May 23, 1945

Section 1, Public Law 690, August 8, 1946
Patent expires May 23, 1965

9 Claims. (Cl. 260—768)

This invention relates to the manufacture of oil resisting rubbers and has more especial reference to the preparation of oil resisting natural rubbers by the addition of aliphatic chlorothiol acids.

Applicant has investigated the reactions of mercaptans and aliphatic chlorothiol acids with olefins and in remarkable contrast to the comparatively unreactive mercaptans, these thioacids were found to react readily with rubber, and almost fully saturated products can be obtained. Mono-, di-, and tri-chlorothiolacetic acids have so far been added to the rubber hydrocarbon. The results will be reviewed separately for each chlorothiolcarboxylic acid.

*Monochlorothiolacetic acid.*—Various products have been made from a benzene solution of rubber and monochlorothiolacetic acid in two ways either by irradiation of the solution with ultraviolet light or by allowing the solution to stand in the presence of a peroxide catalyst. The products in all cases when precipitated with alcohol were white rubber-like materials with the desired higher resistance to oils, though where considerable reaction had occurred they were somewhat hard and less elastic than the original rubber. Their volume absorption of aviation fuel measured over a period of three days at 20° C. covered a wide range, the lowest values being about 20%. The extent of the modification in properties depends to a large degree upon the proportions of the chlorothiolacid interacting with the rubber. A considerable improvement in oil resistance is obtained when rubber is treated with monochlorothiolacetic acid such that there becomes chemically combined an amount which gives the product a chlorine content of not less than 13.3%. Analytical data showed that addition of the thioacid to the rubber hydrocarbon had taken place, very likely in the following way:

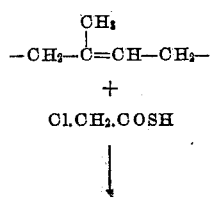

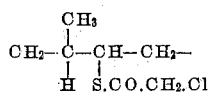

Rubber monochlorothioacetate

*Dichloro and trichlorothioacetic acids.*—Added readily to rubber in benzene solution in ultraviolet light or at room temperature. Highly reacted products containing as much as forty per cent of chlorine were obtained. The analytical evidence supported the usual type of structure.

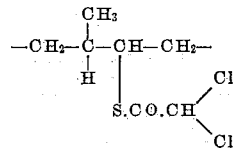

Dichlorothioacetyl rubber

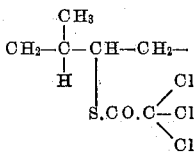

Trichlorothioacetyl rubber

*The preparation of rubber monochlorothiolacetates.*—Derivatives were made from a solution of rubber and monochlorothiolacetic acid by irradiation with ultra-violet light or thermally at various temperatures in the presence of a peroxide catalyst.

The large scale production of rubber monochlorothiolacetate offers no difficulty and preparations are carried out simply by leaving a solution of rubber in benzene or toluene with the acid and in the presence of a catalyst for several days at room temperature, the reaction proceeding satisfactorily in the dark. Ascaridole is a particularly effective catalyst although the reaction will proceed slowly without the addition of a catalyst. The product may be isolated either by precipitation with excess ethyl alcohol or by steam distillation in which latter event the acid requires to be washed from the product, suitably with sodium carbonate solution.

The following table shows some of the results obtained:

| Reaction Conditions | Amount of Rubber | Amount of Solvent | Amount of Thio-Acid Cc. | Time of Reaction | Analysis, Per Cent | Per Cent Absorp. in Aviation Fuel 3 days at 20° C. |
|---|---|---|---|---|---|---|
| 1 | 1 g. "sol" | 20 cc. Benzene | 1.5 | 6 hrs. | Cl. 18.3 / S. 17.1 | 40 |
| 2 | 1 g. (50 Mooney) | 10 cc. Benzene | 1.5 | 7 hrs. | Cl. 15.6 | 60 |
| 3 | do | do | 1.0 | 7 hrs. | Cl. 14.2 | 80 |
| 4 | 12 g. (50 Mooney) | 240 cc. Benzene | 18.0 | 8½ hrs. | Cl. 19.0 / S. 17.6 | 30 |
| 5 | do | do | 12.0 | do | Cl. 14.9 / S. 13.3 | 80 |
| 6 | 1 g. "sol" | 20.0 cc. Benzene | 1.5 | 17 days | Cl. 16.7 / S. 15.0 | 20 |

In Examples 1 to 5 of the above table the mixture was irradiated with ultra-violet light while in Example 6, 0.07 cc. ascaridole was added and the mixture left at room temperature.

In the following tables the reaction mixture used in Examples 7 to 16 was 1 g. of rubber (50 Mooney) dissolved in 10 cc. of toluene 1.0 cc. of monochlorothioacetic acid added and 0.05 cc. of ascaridole; in Example 17 the same mixture was used without the ascaridole while in Example 18 10 g. of rubber (50 Mooney) dissolved in 100 cc. benzene, 18 cc. monochlorothioacetic acid added and 0.5 g. of ascaridole; and in Example 19 25 g. of rubber (50 Mooney) dissolved in 250 cc. benzene 18 cc. of monochlorothioacetic acid added and 1.25 g. of ascaridole was used.

| Reaction Mixture | Temperature | Time | Catalyst | Analysis, percent | Percent Absorption (3 days at 20° C.) Pet. Ether | Percent Absorption (3 days at 20° C.) Aviation Fuel |
|---|---|---|---|---|---|---|
| 7 | Room Temp. | 4 days | Ascaridole | S. 12.5 | 2 | 53 |
| 8 | do | 6 days | do | S. 13.15 | 5 | 43 |
| 9 | do | 10 days | do | S. 15.5 | 1 | 36 |
| 10 | do | 18 days | do | | | 27 |
| 11 | do | 34 days | do | | 0.5 | 24 |
| 12 | 40° C. | 16 hrs. | do | | 20 | 117 |
| 13 | do | 2 days | do | | 44 | 102 |
| 14 | do | 6 days | do | S. 19.95 / Cl. 13.3 | 5 | 74 |
| 15 | −2° C. | 66 hrs. | do | | 7 | 98 |
| 16 | do | 6 days | do | S. 12.05 | 13 | 84 |
| 17 | Room Temp. | 5 days | No Catalyst | | ¹ 155 | |
| 18 | do | 15 days | Ascaridole | S. 16.4 / Cl. 17.5 | | 22 |
| 19 | do | 15 days | do | S. 13.2 / Cl. 15.3 | | 65 |

¹ Slight dispersion.

By the present invention, oil resisting derivatives of natural rubber are obtained.

What we claim is:

1. The process for the preparation of oil resisting derivatives of rubber consisting in reacting aliphatic chlorothiol acids with rubber to obtain a product with a chlorine content of not less than 13.3%, said acid having the general formula $HSCOCX_n$ in which X is chlorine and $n$ is from 1 to 3, and the ratio chlorothiol acid to $C_5H_8$ is about 1:1.

2. A process for the preparation of oil resisting derivatives of rubber consisting in reacting aliphatic chlorothiol acids with rubber in solution and isolating the product, said acid having the general formula $HSCOCX_n$ in which X is chlorine and $n$ is from 1 to 3, and the ratio chlorothiol acid to $C_5H_8$ is about 1:1.

3. A process for the preparation of oil resisting derivatives of rubber according to the preceding claim 1 wherein the reaction is carried out in the presence of a peroxide catalyst such as ascaridole.

4. A process for the preparation of oil resisting derivatives of rubber according to the preceding claim 2 wherein the solution is irradiated with ultra violet light to accelerate the reaction.

5. A process according to the preceding claim 2 wherein an organic solvent such as benzene is employed.

6. A process for the preparation of oil resisting derivatives of rubber according to claim 2 wherein the product is isolated by precipitation with excess ethyl alcohol.

7. A process for the preparation of oil resisting derivatives of rubber according to claim 2 wherein the product is isolated by removing the solvent by steam distillation.

8. Oil resisting derivatives of rubber with a chlorine content of not less than 13.3% obtained by reacting rubber with aliphatic chlorothiol acids, said acid having the general formula $HSCOCX_n$ in which X is chlorine and $n$ is from 1 to 3, and the ratio chlorothiol acid to $C_5H_8$ is about 1:1.

9. A process for the preparation of oil resisting derivatives of rubber consisting in reacting chlorothiolacetic acid with rubber in solution and isolating the product, said acid having the general formula $HSCOCX_n$ in which X is chlorine and $n$ is from 1 to 3, and the ratio chlorothiol acid to $C_5H_8$ is about 1:1.

JOHN IVAN CUNNEEN.

REFERENCES CITED

The following references are of record in the file of this patent:

UNITED STATES PATENTS

| Number | Name | Date |
|---|---|---|
| 2,191,266 | Williams et al. | Feb. 20, 1940 |
| 2,287,773 | Bacon et al. | June 30, 1942 |
| 2,419,943 | Burke | May 6, 1947 |

FOREIGN PATENTS

| Number | Country | Date |
|---|---|---|
| 582,565 | Germany | Aug. 17, 1933 |